March 17, 1970     C. GEORGE     3,501,166
AUTOMOBILE STABILIZER
Filed April 10, 1968

INVENTOR.
Charles George
BY *Yuter & Spiecens*
ATTORNEY

United States Patent Office 3,501,166
Patented Mar. 17, 1970

3,501,166
AUTOMOBILE STABILIZER
Charles George, Great Neck Estates, N.Y., assignor to Lee Myles Corp., Maspeth, N.Y., a corporation of New York
Filed Apr. 10, 1968, Ser. No. 720,241
Int. Cl. B60r 27/00
U.S. Cl. 280—150                                    4 Claims

ABSTRACT OF THE DISCLOSURE

An automobile stabilizer comprising an elongated support adapted to be connected to the trunk floor and upon which a weight is pivotally mounted by means which include an intermediate arm. Springs extend outwardly from the respective ends of the weight and bear against the arms to produce opposed forces on the weight to maintain the weight in a central position.

---

The present invention relates generally to an automobile stabilizer and, more particularly, pertains to an automobile stabilizer for reducing or eliminating skidding chiefly due to centrifugal forces.

When an automobile rounds a curve or makes a turn it experiences a centrifugal force which tends to make the rear wheels of the car skid along the road in a direction normal to the travel of the car. Moreover, the chances of skidding under such circumstances substantially increase due to such factors as increased automobile speed, a small radius of curvature of the curve, inclement weather conditions, and road conditions such as icy or wet pavements. Accordingly, a large percentage of highway accidents involve skidding.

In order to reduce traffic fatalities and injuries, many automobile safety devices have been installed such as padded dash boards, collapsible steering wheels, popout windshields, and the like. However, all these devices are directed to reducing injuries after the fact (after a crash) rather than eliminating the causative factor—the actual skidding which produces the crash. While a few so-called anti-skid devices or automobile stabilizers have been proposed in the past, they have a number of serious disadvantages. For example, such prior devices have been found to be relatively inefficient, extremely difficult and costly to manufacture, or require special mounting techniques which render them incompatible for use in many models of automobiles.

Accordingly, an object of the present invention is to provide an efficient automobile stabilizer for reducing or eliminating skidding.

A further object of the present invention is to provide an automobile stabilizer which is simple to construct and relatively inexpensive to manufacture.

Another object and feature of the present invention resides in the novel details of construction which provide a stabilizer of the type described which is operable to reduce vibrations caused by rough roadways by increasing the traction of the rear wheels of the vehicle.

Still another object of this invention is the provision of a stabilizer which easily may be mounted in the trunk of any automobile.

Accordingly, an automobile stabilizer constructed according to the present invention comprises an elongated member adapted to be affixed to the rear portion of a vehicle. A weight is provided and mounting means mounts the weight on the member for pivoted movement with respect thereto. Biasing means is received between the weight and the mounting means to maintain the weight in a preselected position. Thus, whenever the vehicle begins to skid (i.e., the rear end of the vehicle begins to pivot about the front wheels) the stabilizer applies a compensating force in a direction opposite to the direction of the skid, thereby arresting or automatically stopping such skidding action.

Other features and advantages of the present invention will become more apparent from a consideration of the following detailed description when taken in conjunction with the accompanying drawing, in which.

Figure 4:
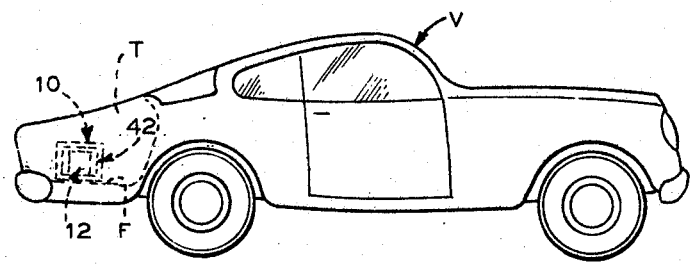
FIG. 4 is a side elevational view of a vehicle illustrating the placement of the stabilizer therein.

An automobile stabilizer constructed according to the present invention is designated generally by the reference numeral 10 in the figures and comprises an inverted trapezoidal weight 12 pivotally mounted to base or supporting member 14. More specifically, the member 14 includes an elongated base plate 16 having upstanding side flanges 18 to define a channel structure.

Connected to the base plate 16 are longitudinally spaced mounting members designated generally by the reference numerals 20 and 22, which mount the weight 12 for pivoted or reciprocable movement in the direction indicated by the double arrowhead 24, with respect to the plate 16. Since the members 20, 22 are identical in construction only the member 20 will be described in detail. Corresponding elements of the members 20, 22 will be designated by the same letter suffix. Accordingly, the member 20 includes a foot section 20A which is connected to the plate 16 by any conventional means such as welding. Connected to the foot section by a pivotal connection 20B is an intermediate section or lever arm 20C. A pivotal connection 20D connects an upper arm 20E to the lever arm 20C. The upper arm 20E extends in a direction opposite to the direction of the foot section 20A and is connected to the upper surface of the weight 12 as by a welding operation.

Hence, the supporting members 20 and 22 support the weight 12 at its respective ends. Moreover, the respective lever arms 20C and 22C, which are pivotable about the associated connections 20B, 20D and 22B, 22D, provide for the reciprocable movement of the weight 12 on the base plate 16.

Extending inwardly from the respective end walls of weight 12 are bores 26 and 28 having respective end walls 30 and 32. The bores 26, 28 are centrally located with respect to the front and rear surfaces of the weight 12. However, the axis of the bores 26, 28 is spaced below the center of the weight. That is, the center line 34 indicates the longitudinal axis of the weight 12 which is located mid-way between the upper and lower surfaces thereof. On the other hand, the common and horizontal axis 36 of the bores 26, 28 is spaced below the axis 34 of the weight 12.

Figure 1:
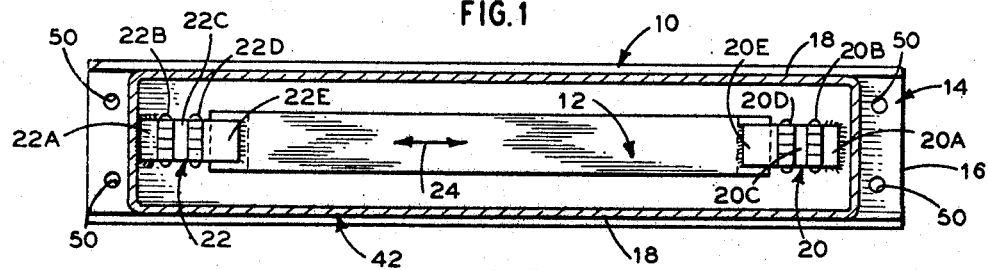
FIG. 1 is a top plan view of an automobile stabilizer constructed according to the present invention, with cover removed.

Received within the bores 26 and 28 are respective springs 38 and 40. The spring 38 extends beyond the bore 26 and bears against the lever arm 20C at one end and against the end wall 30 at the other end. Similarly, the spring 40 extends beyond the weight 12 and bears against the lever arm 22C at one end and against the end wall 32 at the other end. The springs 38 and 40 exert opposed and equal forces on the weight 12 to maintain the weight in the equilibrium or preselected position shown in FIGS. 1 and 2.

Moreover, the springs 38 and 40 are positioned so that the spring 38 opposes displacement of the weight 12

Figure 2:
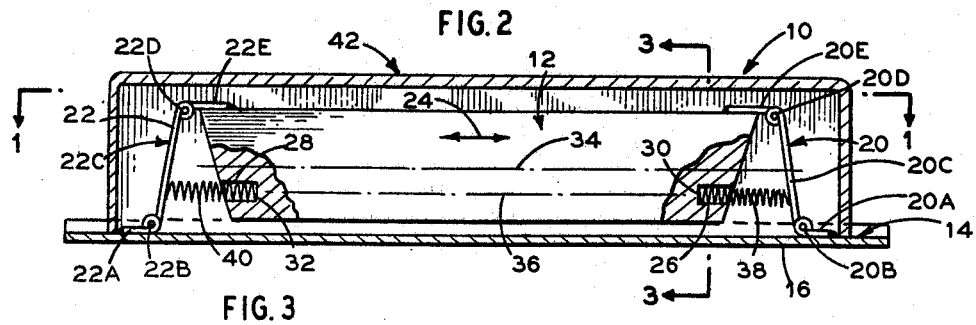
FIG. 2 is a front elevational view thereof, with parts broken away.

The springs are normally compressed when the weight is in its equilibrium position. toward the right, as taken in FIG. 2, and the spring 40 opposes movement of the weight toward the left. It being noted that such displacement will occur if the vehicle containing the stabilizer 10 skids, as noted in detail below.

Figure 3:
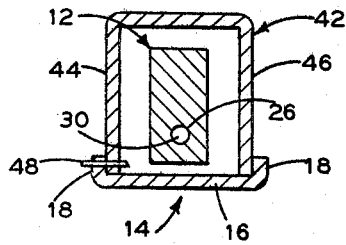
FIG. 3 is a sectional view thereof taken along line 3—3 of FIG. 2.

As shown in FIG. 3, an enclosed hollow cover 42 having an open bottom is provided to house the elements shown in FIG. 2. The cover 42 is provided with front and rear walls 44 and 46 which are sized to fit between the flanges 18 of the base support member 14. The base plate 16 extends beyond the end walls of the cover 42; however, sufficient clearance is provided between the walls of the cover 42 and the weight 12 so that the cover will not interfere with any movements of the elements. Additionally, aligned holes may be provided in the flanges 18 and the coder 42 through which screws 48 or rivets or the like may extend to fasten the cover 42 to the base support member 14 to provide a sealed unit.

In operation, the support member 14 is bolted or otherwise affixed to the floor F (FIG. 1) of the trunk T of an automobile or vehicle V, as the bolts (not shown) which extend through bores 50 in the portion of the base plate 16 which extends beyond the cover 42. More particularly, the stabilizer 10 is mounted in a horizontal position as far to the rear of the vehicle V as possible and centrally and transversely with respect to the longitudinal axis of the automobile.

Accordingly, as the automobile moves forward in a straight line, the automobile is balanced and the springs 38 and 40 maintain the weight 12 in the equilibrium position. As the car begins to skid to the left, for example, the support member 14, which is rigidly affixed to the car, will similarly move to the left. However, the heavy weight 12, which has an extremely high inertia due to its large mass, will resist such motion. Hence, the lever arm 20C will move toward the weight 12 thereby compressing the spring 38. Thus, a restoring force will be generated in a direction opposite to the skid to reduce or entirely stop such skidding action and thereby to stabilize the movement of the car.

In practice, it has been found that a stabilizer having the following specifications performs most advantageously. The weight 12 is fabricated from a heavy material such as iron or lead and the like and has a weight of forty-seven pounds and dimensions of 18" length on the top surface; 16" length on the bottom surface; 4" height, and 2" width. The bores 26 and 28 are each 1½" in length and their common axis is positioned 1½" from the bottom surface of the weight. The springs 38 and 40 are each 3" in length and have a force constant of 52 pounds/inch. The base supporting member is 26" in length and the weight is centrally located thereon.

Accordingly, an automobile stabilizer has been disclosed which is simple in construction and economic to manufacture and which efficiently reduces or eliminates car skidding.

While a preferred embodiment of the invention has been shown and disclosed it will become obvious that numerous omissions, changes and additions may be made in such embodiment without departing from the spirit and scope of the present invention.

What is claimed is:

1. An automobile stabilizer including an elongated base member; an elongated weight having respective ends; mounting means connected to each end of said weight for mounting said weight on said base member for reciprocable movement with respect thereto; each of said mounting means including a first section connected to said base member, a second section connected to the end of said weight, and an intermediate section pivotally connected between said first and second sections; and a respective biasing means extending between and bearing upon each of said intermediate sections and said weight with respective opposed forces sufficient to maintain said weight in a preselected intermediate position, said biasing means including respective springs, a bore in each end of said weight, each of said bores having an end wall, at least a portion of each spring being received in the associated bore, said springs being sized to exert opposed forces against the respective end walls of said bores.

2. An automobile stabilizer as in claim 1, in which said weight has a central longitudinal axis, and said bores have a common horizontal axis which is spaced below said longitudinal axis.

3. An automobile stabilizer as in claim 1, in which said weight is in the shape of an inverted trapezoid.

4. An automobile stabilizer as in claim 3, in which said member comprises a channel having a base wall and a pair of opposed upstanding flanges, and a cover adapted to receive said elongated weight and mounting means therein and to be connected to at least one of said flanges.

References Cited

UNITED STATES PATENTS

| 1,095,821 | 5/1914 | Crawford | 267—1 |
| 2,990,193 | 6/1961 | Heard | 280—150 |

FOREIGN PATENTS

| 860,846 | 1/1961 | France. | |

BENJAMIN HERSH, Primary Examiner

R. R. SONG, Assistant Examiner

UNITED STATES PATENT OFFICE
CERTIFICATE OF CORRECTION

Patent No. 3,501,166　　　　　　　　　　　　March 17, 1970

Charles George

It is certified that error appears in the above identified patent and that said Letters Patent are hereby corrected as shown below:

Column 3, lines 1 and 2, cancel "The springs are normally compressed when the weight is in its equilibrium position." and insert the same after "thereon." in column 4, line 1. Same column 3, line 17, "coder" should read -- cover --.

Signed and sealed this 29th day of December 1970.

(SEAL)
Attest:

Edward M. Fletcher, Jr.　　　　　　　　WILLIAM E. SCHUYLER, JR.
Attesting Officer　　　　　　　　　　　　Commissioner of Patents